United States Patent
Ikeda et al.

(10) Patent No.: US 11,216,405 B2
(45) Date of Patent: Jan. 4, 2022

(54) ELECTRONIC DEVICE

(71) Applicant: FUJIFILM Business Innovation Corp., Tokyo (JP)

(72) Inventors: Shinho Ikeda, Kanagawa (JP); Kenji Imamura, Kanagawa (JP); Masahiro Kobata, Kanagawa (JP); Takanori Fukuoka, Kanagawa (JP); Yuji Murata, Kanagawa (JP); Kazuhiko Abe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 132 days.

(21) Appl. No.: 16/294,881

(22) Filed: Mar. 6, 2019

(65) Prior Publication Data
US 2019/0286609 A1  Sep. 19, 2019

(30) Foreign Application Priority Data
Mar. 16, 2018  (JP) .............................. JP2018-050182

(51) Int. Cl.
*G06F 13/42* (2006.01)
*G06F 1/32* (2019.01)
*G06F 13/20* (2006.01)
*G06F 1/24* (2006.01)
(Continued)

(52) U.S. Cl.
CPC ............ *G06F 13/4282* (2013.01); *G06F 1/32* (2013.01); *G06F 13/20* (2013.01)

(58) Field of Classification Search
CPC ....... G06F 1/3234; G09G 5/006; G06K 15/02
See application file for complete search history.

(56) References Cited

U.S. PATENT DOCUMENTS 10,061,282 B2  8/2018 Kanda
2013/0242341 A1*  9/2013 Kasahara ........... G06K 15/4055
358/1.15
(Continued)

FOREIGN PATENT DOCUMENTS

JP  2010-211351  9/2010
JP  2014-071485  4/2014
(Continued)

OTHER PUBLICATIONS

"Office Action of Japan Counterpart Application", dated Oct. 12, 2021, with English translation thereof, pp. 1-10.

*Primary Examiner* — Getente A Yimer
(74) *Attorney, Agent, or Firm* — JCIPRNET

(57) ABSTRACT

An electronic device includes plural modules; a return factor detection unit that detects a return factor causing return from an energy-saving state; and a return controller that causes the plural modules to start return processing upon detection of the return factor by the return factor detection unit. The plural modules include a first module and a second module that are connected by using a high-speed serial interface that needs preprocessing for establishment of connection without software, and the second module, which performs return processing upon receipt of a trigger of return from an energy-saving state through the first module, starts the preprocessing for establishment of connection using the high-speed serial interface in parallel with return processing of the first module.

4 Claims, 9 Drawing Sheets

(51) Int. Cl.
G06F 1/3237 (2019.01)
G06F 1/3287 (2019.01)

(56) References Cited

U.S. PATENT DOCUMENTS

| | | | |
|---|---|---|---|
| 2014/0111526 A1* | 4/2014 | Asaka | G09G 5/006 345/520 |
| 2015/0055663 A1* | 2/2015 | Quinn | H04B 10/801 370/535 |
| 2016/0266623 A1 | 9/2016 | Ito | |
| 2016/0292108 A1* | 10/2016 | Konishi | G06F 13/366 |
| 2016/0357699 A1* | 12/2016 | Shamarao | G06F 13/385 |
| 2018/0314666 A1* | 11/2018 | Tanaka | G06F 13/404 |
| 2021/0019098 A1* | 1/2021 | Tanihata | G06F 1/3206 |

FOREIGN PATENT DOCUMENTS

| | | |
|---|---|---|
| JP | 2015103999 | 6/2015 |
| JP | 2016111447 | 6/2016 |
| JP | 2016-167203 | 9/2016 |

\* cited by examiner

ELECTRONIC DEVICE

CROSS-REFERENCE TO RELATED APPLICATIONS

This application is based on and claims priority under 35 USC 119 from Japanese Patent Application No. 2018-050182 filed Mar. 16, 2018.

BACKGROUND

(i) Technical Field

The present disclosure relates to an electronic device.

(ii) Related Art

Many apparatuses employ, as one of operation modes, an energy-saving mode for suppressing supply of power to some of modules that constitutes the apparatus while the apparatus is not operating. Japanese Unexamined Patent Application Publication No. 2010-211351 discloses a related art in which setting information necessary for reinitialization of a module to be powered off is stored in a non-volatile memory before shift to an energy-saving mode, and the setting information is read out for setting of the module from the non-volatile memory without an initialization process similar to cold boot when the module returns from the energy-saving mode.

Japanese Unexamined Patent Application Publication No. 2014-71485 discloses a related art in which link-up is established within a predetermined period by starting an initialization process while giving a priority to a device that needs a long time for the initialization process among devices (modules) that communicate by using PCI Express (Registered Trademark; hereinafter referred to as PCIE).

Japanese Unexamined Patent Application Publication No. 2016-167203 discloses a related art in which in a configuration in which communication is performed by using PCIE and a field programmable gate array (FPGA) is provided, an activation period is shortened by starting FPGA setting (including PCIE) that needs a long time before reset cancellation when the FPGA is powered on.

SUMMARY

In a case where at least some of plural modules are connected by using a high-speed serial interface that needs preprocessing for establishment of connection without software, where a first module and a second module are connected by using such a high-speed serial interface, where the second module receives a trigger of return from an energy-saving state through the first module, and where return from an energy-saving mode for stopping supply of electric power to modules excluding a certain module is performed, it takes time to complete the return according to a procedure of establishing connection between the first module and the second module after completion of initialization of the first module.

Aspects of non-limiting embodiments of the present disclosure relate to making a period required for return from an energy-saving mode shorter than the configuration in which preprocessing for establishing connection between the first module and the second module starts after completion of initialization of the first module.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an electronic device including plural modules; a return factor detection unit that detects a return factor causing return from an energy-saving state; and a return controller that causes the plural modules to start return processing upon detection of the return factor by the return factor detection unit. The plural modules include a first module and a second module that are connected by using a high-speed serial interface that needs preprocessing for establishment of connection without software, and the second module, which performs return processing upon receipt of a trigger of return from an energy-saving state through the first module, starts the preprocessing for establishment of connection using the high-speed serial interface in parallel with return processing of the first module.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described below in detail with reference to the attached drawings. The present exemplary embodiment relates to an electronic device that is constituted by plural functional modules (hereinafter simply referred to as modules). The modules can be connected by using various kinds of interfaces, but in the present exemplary embodiment, a high-speed serial interface is used between at least some of the modules. The high-speed serial interface used in the present exemplary embodiment will be described later. The electronic device according to the present exemplary embodiment is applied, for example, to a control device for an information processing apparatus such as an image processing apparatus.

Example of Configuration to Which Electronic Device is Applied

Figure 1:
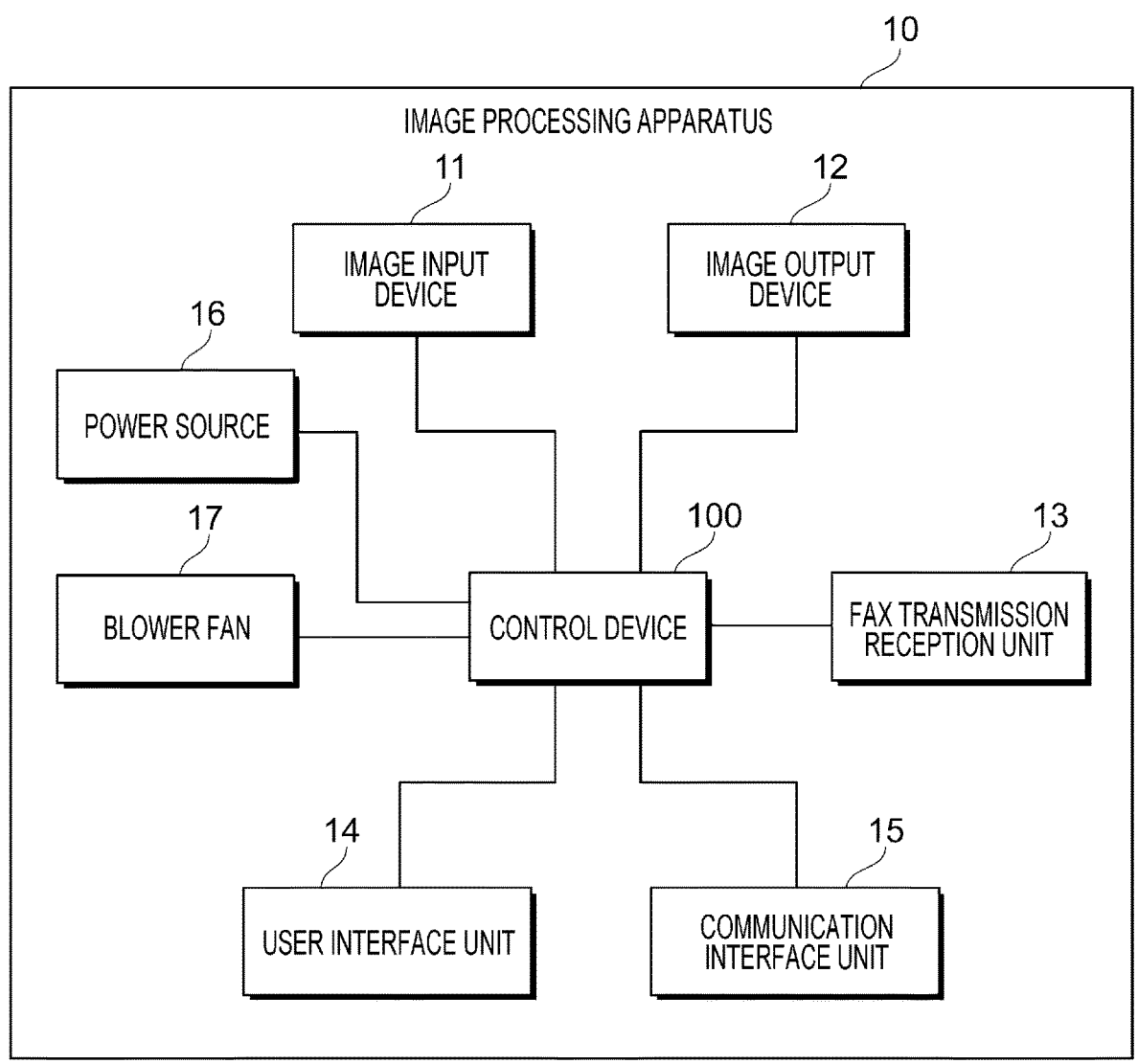
FIG. 1 illustrates an example of a configuration of an information processing apparatus to which an electronic device according to the present exemplary embodiment is applied.

FIG. 1 illustrates an example of a configuration of an information processing apparatus to which the electronic device according to the present exemplary embodiment is applied. FIG. 1 illustrates an example in which the electronic device according to the present exemplary embodiment is used as a control device for an image processing apparatus. The image processing apparatus 10 includes, for example, a control device 100, an image input device 11, an image output device 12, and a FAX transmission reception unit 13. Furthermore, the image processing apparatus 10 includes a user interface unit 14, a communication interface unit 15, a power source 16, and a blower fan 17.

The control device 100 controls each functional unit of the image processing apparatus 10. The control device 100 includes plural modules. Each of the modules controls some functional units of the image processing apparatus 10. Connection between at least some of the modules uses a high-speed serial interface. Details of a configuration of the control device 100 will be described later.

The image input device 11 is an image input terminal (IIT). The image input device 11 is constituted by a scanner device, and optically reads an image on a placed document and generates a read image (image data). Examples of an image reading system include a charge coupled device (CCD) system in which light emitted from a light source and reflected by a document is reduced in size by a lens and is then received by a CCD and a contact image sensor (CIS) system in which light sequentially emitted from light emitting diode (LED) light sources and then reflected by a document is received by a CIS.

The image output device 12 is an image output terminal (IOT). The image output device 12 is constituted by a printer device and forms an image based on image data on a sheet of paper that is an example of a recording material by using an image formation material. Examples of a system for forming an image on a recording material include an electrophotographic system for forming an image by transferring toner attached to a photoconductor onto a recording material and an inkjet system for forming an image by ejecting ink onto a recording material.

The FAX transmission reception unit 13 controls transmission and reception of image data using a facsimile function. Specifically, the FAX transmission reception unit 13 is connected to an external apparatus through a telephone line, and transmits an image read by the image input device 11 to the external apparatus and receives an image from the external apparatus.

The user interface (UI) unit 14 includes a display on which a screen such as an operation screen is displayed and an input unit used for an operator's input operation. The display is, for example, a liquid crystal display. The input unit is, for example, a hardware key or a touch sensor. For example, a touch panel combining a liquid crystal display that is a display and a touch sensor that is an input unit may be used.

The communication interface unit 15 is a connection unit that is connected to a network and an external apparatus and exchanges data. A network port for Ethernet (Registered Trademark), a universal serial bus (USB) port, a wireless communication device for connection using a wireless LAN or Bluetooth (Registered Trademark), or the like is provided depending on the kind of means of communication although these are not distinguished from each other.

The power source 16 supplies electric power to each functional unit of the image processing apparatus 10. The power source 16 supplies electric power under control of the control device 100. This will be described later in detail. The blower fan 17 is a device that blows air to cool an inside of a housing of the image processing apparatus 10. The configuration illustrated in FIG. 1 is merely an example, and functional units that constitute the image processing apparatus 10 are not limited to the functional units illustrated in FIG. 1. For example, the image processing apparatus 10 may include a human sensor that senses approach of an operator, an authentication unit that authenticates an operator, a money charging device that charges money for execution of a process, and the like in addition to the configuration illustrated in FIG. 1.

Example of Configuration of Control Device

Figure 2:
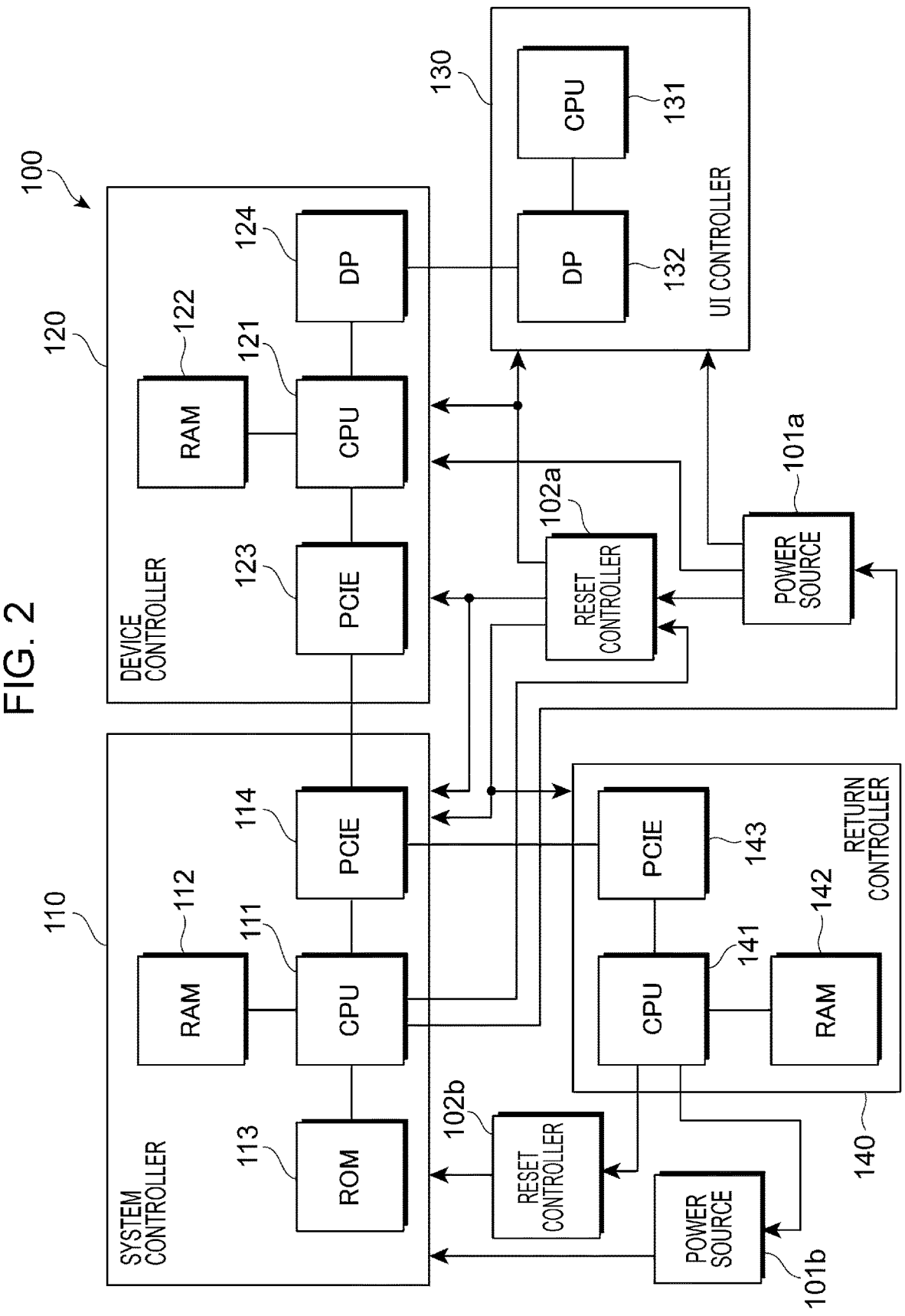
FIG. 2 illustrates an example of a configuration of a control device.

FIG. 2 illustrates an example of a configuration of the control device 100. The control device 100 is constituted by plural modules that are hierarchically connected. In the example illustrated in FIG. 2, the control device 100 includes the following four modules: a system controller 110, a device controller 120, a UI controller 130, and a return controller 140. In the example illustrated in FIG. 2, the modules of the control device 100 are connected in multiple stages in series in an order of the return controller 140, the system controller 110, the device controller 120, and the UI controller 130. Hereinafter, among the modules aligned in this order, the return controller 140 side is referred to as a former stage, and the UI controller 130 side is referred to as a latter stage.

The system controller 110 is a module that controls the whole system of the image processing apparatus 10. Furthermore, the system controller 110 controls transmission and reception of data to and from a network or an external apparatus that are performed through the communication interface unit 15. Furthermore, the system controller 110 performs reset control on the system controller 110 itself and other modules (the device controller 120, the UI controller 130, and the return controller 140 in the example of the configuration illustrated in FIG. 2) of the control device 100. Furthermore, the system controller 110 controls supply of electric power to the system controller 110 itself and modules (the device controller 120 and the UI controller 130 in the example of the configuration illustrated in FIG. 2) other than the return controller 140.

In the example of the configuration illustrated in FIG. 2, the system controller 110 includes a CPU 111 that is a computing unit, a RAM 112 used as a working memory, and a ROM 113 that is a storage unit in which a program is stored. Furthermore, the system controller 110 includes a PCIE interface 114 for connection with a former-stage module (the return controller 140 in the example of the configuration illustrated in FIG. 2) and a latter-stage module (the device controller 120 in the example of the configuration illustrated in FIG. 2). The CPU 111 performs various kinds of control by reading a program stored in the ROM 113 and executing the program. The system controller 110 may be configured, for example, as an application specific standard procedure (ASSP) in which the CPU 111, the RAM 112, the ROM 113, and the PCIE interface 114 are incorporated.

The device controller 120 is a module that controls various devices provided in the image processing apparatus 10. That is, the device controller 120 controls, for example, the image input device 11, the image output device 12, the FAX transmission reception unit 13, and the blower fan 17 illustrated in FIG. 1.

In the example of the configuration illustrated in FIG. 2, the device controller 120 includes a CPU 121 that is a computing unit and a RAM 122 used as a working memory. Furthermore, the device controller 120 includes a PCIE interface 123 for connection with a former-stage module (the system controller 110 in the example of the configuration illustrated in FIG. 2) and a display port (hereinafter referred to as a DP) 124 for connection with a latter-stage module (the UI controller 130 in the example of the configuration illustrated in FIG. 2). The CPU 121 controls various devices in accordance with a command received from the system controller 110. The device controller 120 may be configured, for example, as an application specific integrated circuit (ASIC) in which the CPU 121, the RAM 122, the PCIE interface 123, and the DP 124 are incorporated.

The UI controller 130 is a module that controls a UI (the UI unit 14 in the example of the configuration illustrated in FIG. 1) of the image processing apparatus 10. That is, the UI controller 130 causes a screen such as an operation screen or an information screen for presenting information to an operator to be displayed on the display that constitutes the UI unit 14.

In the example of the configuration illustrated in FIG. 2, the UI controller 130 includes a CPU 131 that is a computing unit and a DP 132 for connection with a former-stage module (the device controller 120 in the example of the configuration illustrated in FIG. 2). The CPU 131 causes various kinds of screens to be displayed on the display of the UI unit 14 on the basis of a command and screen data received from the device controller 120. The UI controller 130 may be provided, for example, in the UI unit 14 separately from the system controller 110 and the device controller 120.

The return controller 140 controls return processing from an energy-saving mode in the system controller 110, the device controller 120, and the UI controller 130. The image processing apparatus 10 has an energy-saving mode as one of operation modes. The energy-saving mode is an operation mode for reducing electric power consumption by stopping supply of electric power to some of the members that constitutes the image processing apparatus 10. There are various types of energy-saving mode. One type is partial energy saving for stopping supply of electric power simply by selecting a module or a device that does not need power supply. Another type is a method of stopping supply of electric power after storing data necessary for activation of a module or a device in a non-volatile memory. According to this type, speedy return is realized by reading out the data from the non-volatile memory at a time of activation. In the present exemplary embodiment, it is assumed that electric power is supplied only to the return controller 140 and supply of electric power to other controllers is stopped in the energy-saving mode in the control device 100 although a type of energy-saving mode is not limited in particular.

The return controller 140 monitors occurrence of a predetermined return factor in the energy-saving mode. The return factor is an event that is determined as a factor for returning from the energy-saving mode to a normal operation mode. Specifically, for example, reception of some sort of signal through the communication interface unit 15, detection of input to the input unit of the UI unit 14, detection of approach of a human by a human sensor (not illustrated), or the like can be set as the return factor. Upon detection of a return factor, the return controller 140 gives a notification (return instruction) to the system controller 110 so that the system controller 110 starts return processing. Then, the system controller 110 gives a notification (return instruction) to the device controller 120 and the UI controller 130 so that the device controller 120 and the UI controller 130 start return processing. Details of the return processing will be described later.

In the example of the configuration illustrated in FIG. 2, the return controller 140 includes a CPU 141 that is a computing unit and a RAM 142 used as a working memory. Furthermore, the return controller 140 includes a PCIE interface 143 for connection with the system controller 110. The CPU 141 monitors occurrence of a return factor by using a physical layer chip (PHY chip) provided in the CPU 141 and media access control (MAC) and performs return processing by starting supply of electric power to the system controller 110 upon detection of occurrence of a return factor.

As described above, the modules illustrated in FIG. 2 are configured such that the return controller 140 and the system controller 110 are connected to each other, the system controller 110 and the device controller 120 are connected to each other, and the device controller 120 and the UI controller 130 are connected to each other. Connection between the return controller 140 and the system controller 110 and connection between the system controller 110 and the device controller 120 use PCIE interfaces (hereinafter referred to as PCIEs). Connection between the device controller 120 and the UI controller 130 use DPs. The PCIEs and DPs are high-speed serial interfaces. These interfaces need link training as preprocessing so that connection (link) is established and the interfaces become communicable. Connection using such interfaces is connection without software and is, for example, physical-layer-level connection. The link training is operation negotiating with a communication partner after reset cancellation. In the link training, devices in a communication link transmit and receive a basic packet called an order set and decides a link width, a lane order, a link speed, a reception polarity, and the like by negotiating with a communication partner. Note that not all of the high-speed serial interfaces need link training for establishment of connection. Example of an interface that performs link training include a PCIEs and a DP that are used between modules of the control device 100 and a universal serial bus (USB) 3.0. Meanwhile, examples of a high-speed serial interface that does not perform link training include V by One. In the present exemplary embodiment, it is assumed that a high-speed serial interface that performs link training for establishment of connection is used for connection between at least some of the modules that constitute the control device 100. Of two modules that are connected by using a high-speed serial interface that performs link training for establishment of connection, a former-stage module is an example of a first module, and a latter-stage module is an example of a second module.

In the example of the configuration illustrated in FIG. 2, a power source 101a and a reset controller 102a controlled by the system controller 110 and a power source 101b and a reset controller 102b controlled by the return controller 140 are provided in the control device 100. During normal operation of the control device 100, in which the system controller 110 controls the whole system, control of supply of electric power to each module and reset control are performed by the system controller 110. Meanwhile, during the energy-saving mode of the control device 100, in which supply of electric power to the system controller 110 is stopped, the system controller 110 cannot perform control of supply of electric power and reset control. When the control device 100 returns from the energy-saving mode, the return controller 140 performs control of supply of electric power to the system controller 110 and reset control by controlling the power source 101*b* and the reset controller 102*b* and thus causes the system controller 110 to return. Although two pairs of power source 101 (101*a* and 101*b*) and reset controller 102 (102*a* and 102*b*) are illustrated in FIG. 2, this merely shows a difference in control system (i.e., control using the system controller 110 and control using the return controller 140), and one pair of power source and reset controller may be provided actually.

Return Processing of Control Device

Next, return processing from the energy-saving mode in the control device 100 is described. As described with reference to FIG. 2, the control device 100 is constituted by the four modules that are connected in series in the order of the return controller 140, the system controller 110, the device controller 120, and the UI controller 130. In this case, each of the modules receives a notification about return and starts return processing in an order starting from a former-stage module. The notification about return is a notification that triggers start of return processing of a target module. As for the trigger of start of return processing (trigger of return), reset control operation may be performed by starting supply of electric power to a target module instead of the notification about return. Alternatively, start of supply of electric power may be used as a trigger of start of the return processing. In a case where a former-stage module gives a notification about return to a latter-stage module after completion of return processing, a procedure of the return processing of the control device 100 is as follows.

Figure 3:
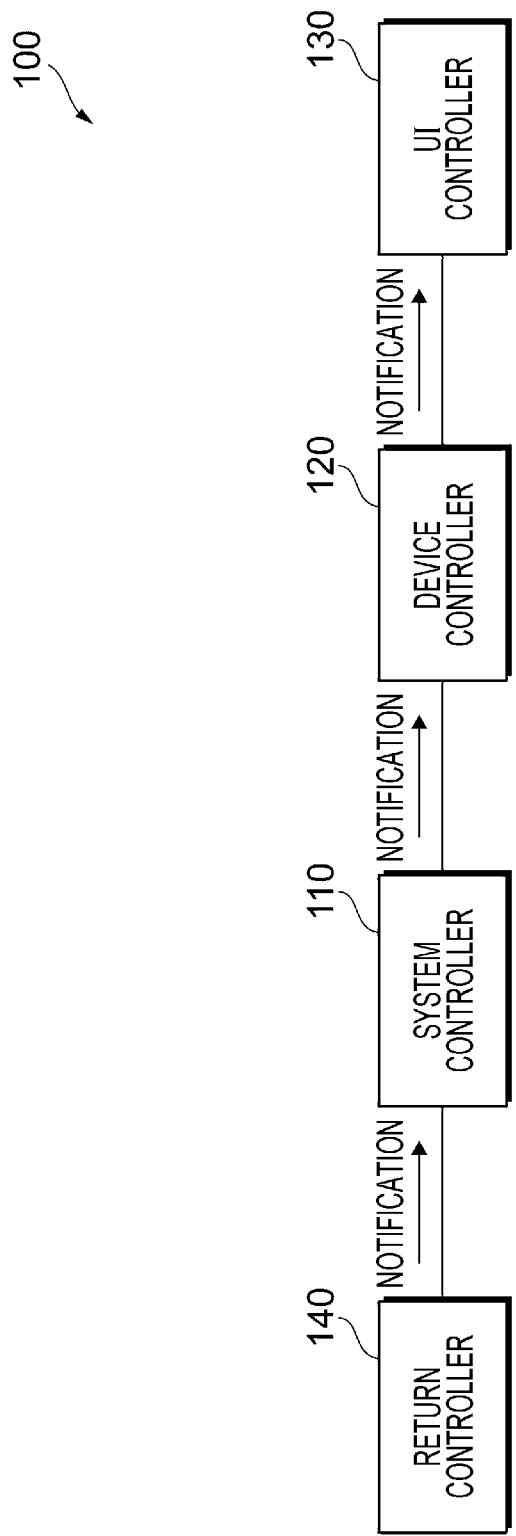
FIG. 3 illustrates a procedure of return processing in a case where a former-stage module transmits a notification about return to a latter-stage module after completion of return processing.

FIG. 3 illustrates a procedure of return processing performed in a case where a former-stage module transmits a notification about return to a latter-stage module after completion of return processing. In this case, upon detection of a return factor, the return controller 140 gives a notification to the system controller 110 that is a latter-stage module so that the system controller 110 starts return processing. In this return processing, connection between the return controller 140 and the system controller 110 is established. After completion of the return processing and shift to normal operation, the system controller 110 gives a notification to the device controller 120 that is a latter-stage module so that the device controller 120 starts return processing. In this return processing, connection between the system controller 110 and the device controller 120 is established. After completion of the return processing and shift to normal operation, the device controller 120 gives a notification to the UI controller 130 that is a latter-stage module so that the UI controller 130 starts return processing. In this return processing, connection between the device controller 120 and the UI controller 130 is established. Then, the UI controller 130 shifts to normal operation after completion of the return processing. As described above, after completion of return processing of a former-stage module, return processing of a latter-stage module starts and connection between the modules is established. Through this procedure, an initialization process is sequentially performed.

Figure 4:
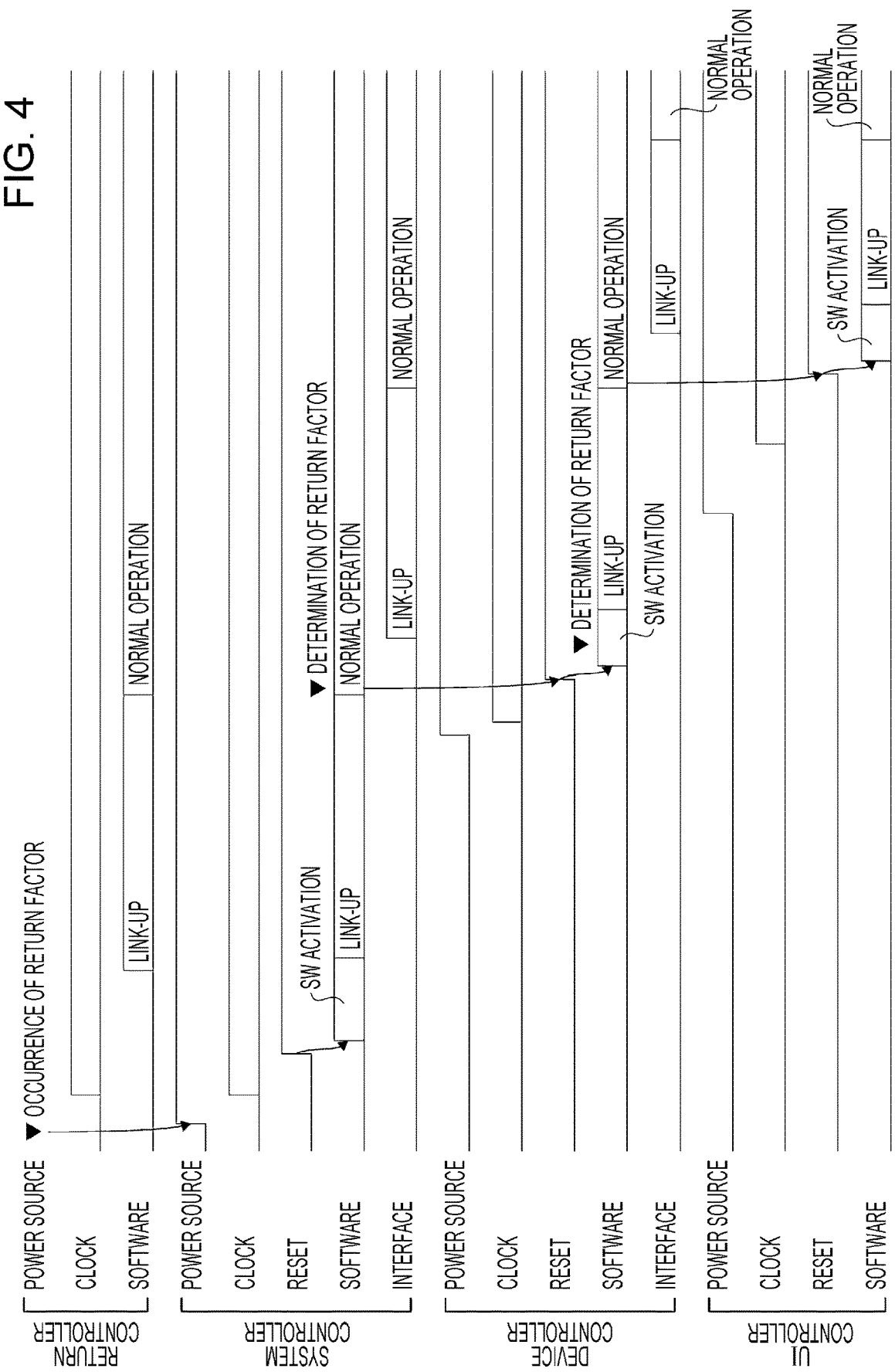
FIG. 4 is a timing diagram illustrating operation of each module in a case where return processing is performed through the procedure illustrated in FIG. 3.

FIG. 4 is a timing diagram illustrating operation of each module in a case where return processing is performed through the procedure illustrated in FIG. 3. In the example illustrated in FIG. 4, the former-stage module activates software (SW) of a latter-stage module by performing reset control instead of a notification about return as a trigger of return transmitted to a latter-stage module so that the latter-stage module starts return processing. In FIG. 4, when each of the system controller 110, the device controller 120, and the UI controller 130 returns from an energy-saving state in the energy-saving mode, first, supply of electric power starts. Then, reception of a clock signal starts. Then, an activation process using software is started by reset control. Furthermore, after return processing of a latter-stage module starts, each module performs processing (link-up) for establishing connection of interfaces (PCIEs, DPs) that connect the module and the latter-stage module. After a former-stage module completes return processing and shifts to normal operation, each module starts return processing by reset control of the former-stage module.

As described above, according to the procedure illustrated in FIG. 3, a latter-stage module cannot start return processing until completion of return processing of a former-stage module. This is because return processing of a latter-stage module starts after shift of a former-stage module to normal operation. However, link training that is preprocessing for establishment of connection between modules can be performed between interfaces of the modules without software and can be performed even in a case where return processing of a former-stage module has not been completed. In view of this, the present exemplary embodiment proposes a procedure for starting processing for establishment of connection between modules before completion of return processing of a former-stage module.

Figure 5:
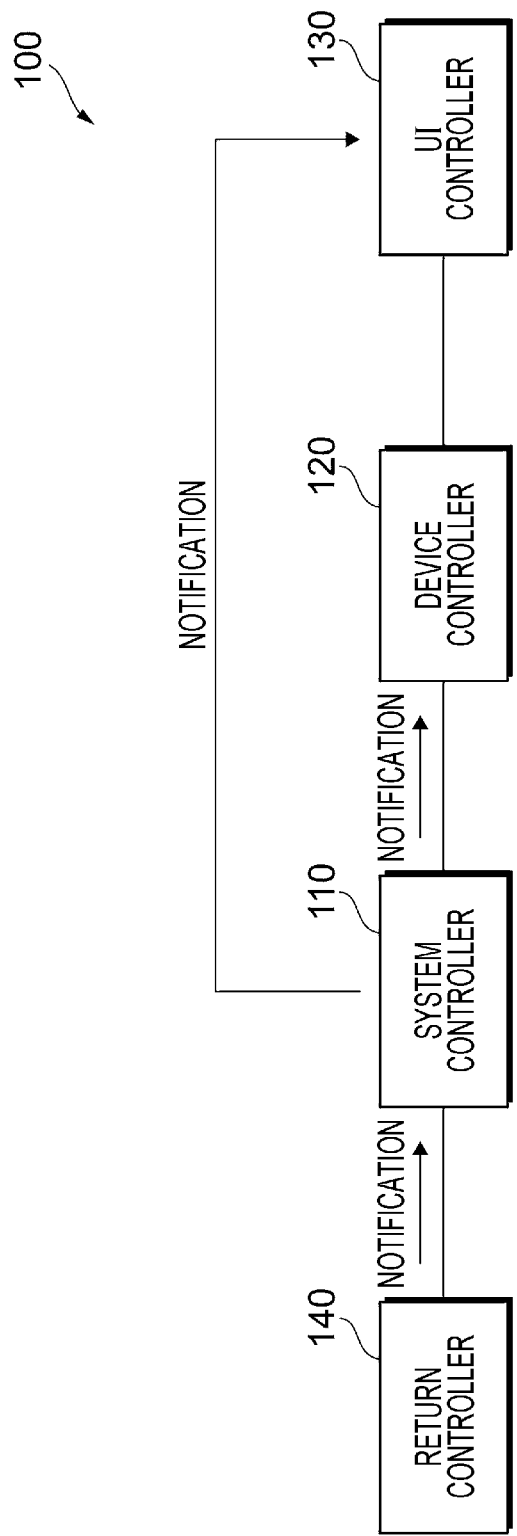
FIG. 5 illustrates a procedure of return processing in a case where processing for establishing connection between modules is started before completion of return processing of a former-stage module.

FIG. 5 illustrates a procedure of return processing in a case where processing for establishing connection between modules starts before completion of return processing of a former-stage module. In this case, upon detection of a return factor, the return controller 140 gives a notification to the system controller 110 that is a latter-stage module so that the system controller 110 starts return processing. In this return processing, connection between the return controller 140 and the system controller 110 is established. The procedure so far is similar to the procedure illustrated in FIG. 3. Next, after completion of the return processing and shift to normal operation, the system controller 110 gives a notification to each module (the device controller 120 and the UI controller 130) on a latter-stage side of the system controller 110. This causes the device controller 120 and the UI controller 130 to start return processing. In this return processing, connection between the system controller 110 and the device controller 120 and connection between the device controller 120 and the UI controller 130 are established. The processing for establishing connection between the system controller 110 and the device controller 120 and processing for establishing connection between the device controller 120 and the UI controller 130 are performed in parallel independently. The device controller 120 and the UI controller 130 shift to normal operation after completion of the return processing.

Figure 6:
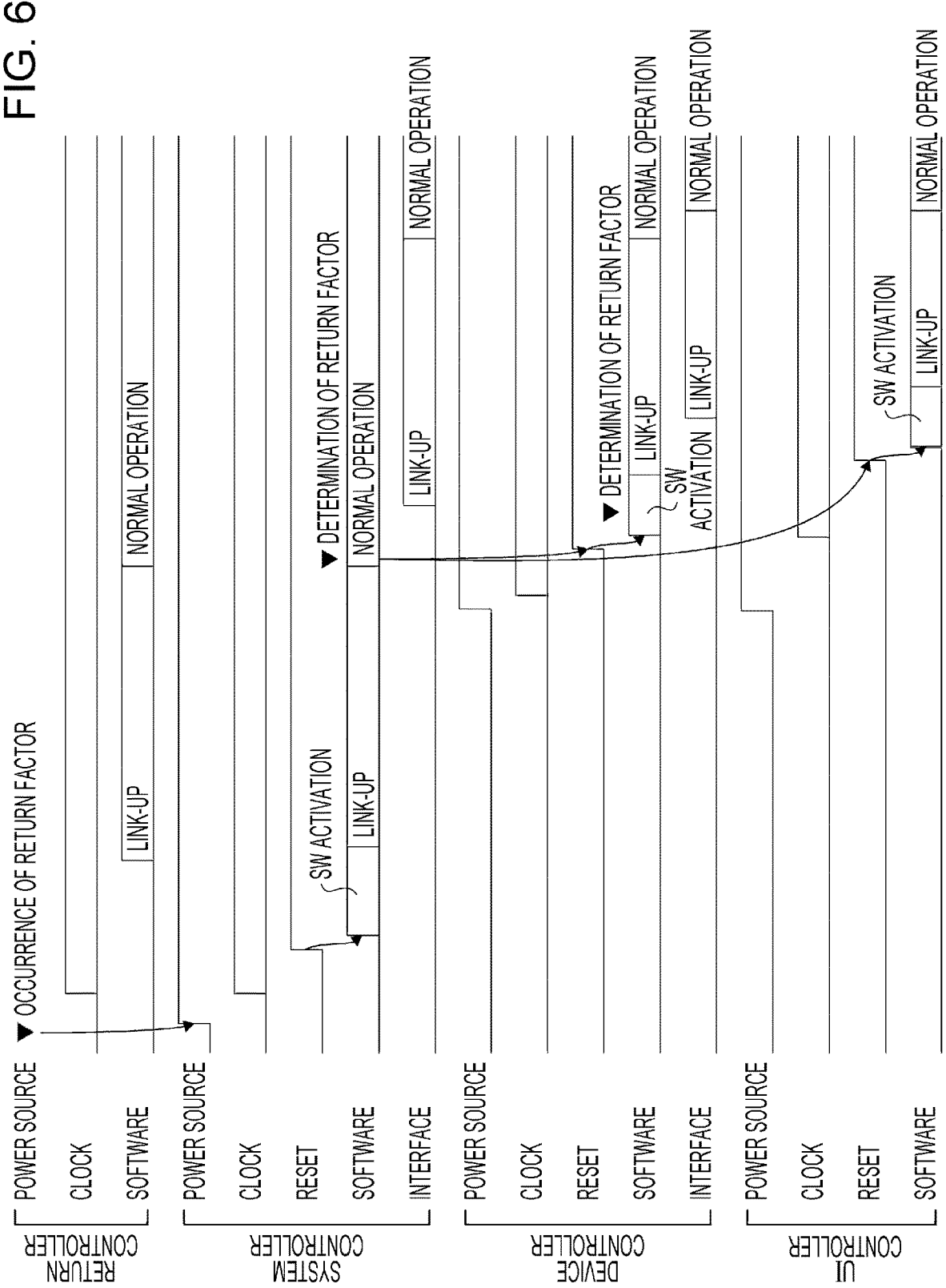
FIG. 6 is a timing diagram illustrating operation of each module in a case where return processing is performed through the procedure illustrated in FIG. 5.

FIG. 6 is a timing diagram illustrating operation of each module in a case where return processing is performed through the procedure illustrated in FIG. 5. Also in the example illustrated in FIG. 6, a former-stage module activates software (SW) of a latter-stage module so that the latter-stage module starts return processing by performing reset control instead of notification about return as a trigger of return transmitted to the latter-stage module. In FIG. 6, operation of return processing in each of the system controller 110, the device controller 120, and the UI controller 130 is similar to the operation described with reference to FIG. 4. In each module, processing (link-up) for establishing connection of interfaces that connect the module and a latter-stage module is performed after return processing of a latter-stage module starts. This is also similar to the operation illustrated in FIG. 4. However, in the operation illustrated in FIG. 6, the device controller 120 and the UI controller 130 start return processing by reset control performed by the system controller 110. Accordingly, return processing of the UI controller 130 starts before completion of the return processing of the device controller 120. Furthermore, processing (link-up) for establishing connection of interfaces (DPs) for connecting the device controller 120 and the UI controller 130 also starts before completion of the return processing of the device controller 120.

As described above, according to the procedure illustrated in FIG. 5, a notification about return is given to the UI controller 130 by the system controller 110. Accordingly, before completion of the return processing of the device controller 120, the UI controller 130 starts return processing and link training between the device controller 120 and the UI controller 130 starts. That is, link training of IPCE interfaces of the device controller 120 that is a former-stage module and the UI controller 130 that is a latter-stage module starts in parallel with the return processing of the device controller 120. This shortens a period from detection of a return factor by the return controller 140 to completion of the return processing of the UI controller 130 as compared with the procedure of starting link training of the IPCE interfaces after completion of the return processing of the device controller 120 as illustrated in FIG. 3.

In the return processing described with reference to FIGS. 5 and 6, the system controller 110 controls return of all modules (both of the device controller 120 and the UI controller 130) on a latter-stage side. Meanwhile, the system controller 110 may change a module to be returned in accordance with the kind of return factor detected by the return controller 140. For example, return control may be performed in accordance with a return factor as follows. For example, in a case where an event of receiving communication to the host apparatus (the image processing apparatus 10) over a network occurs as a return factor, both of the device controller 120 and the UI controller 130 are returned since the image processing apparatus 10 itself need be brought into operation.

In a case where an event of receiving data through facsimile communication occurs as a return factor, the device controller 120 that controls the image output device 12 is returned since the image output device 12 need output the received data. Meanwhile, the UI unit 14 does not perform display operation since an operator is not necessarily close to the image processing apparatus 10 in a case of reception using facsimile communication. Accordingly, the UI controller 130 is not returned.

In a case where a person close to the image processing apparatus 10 is detected by a human sensor (not illustrated) as a return factor, the UI unit 14 performs display operation in order to notify the detected person about operation of the image processing apparatus 10 (power activation). Accordingly, the UI controller 130 is returned. Meanwhile, since whether or not the detected person operates the image processing apparatus 10 is unknown until the person actually operates the image processing apparatus 10, it is unnecessary to activate the various device such as the image input device 11 and the image output device 12 at this point in time. Accordingly, the device controller 120 is not returned.

As described above, complicated control such as returning a module that differs depending on a return factor is performed not by the return controller 140 but by the system controller 110. In view of this, in the return processing illustrated in FIGS. 5 and 6, first, the return controller 140 returns the system controller 110, and the system controller 110 that has completed return processing controls return of the device controller 120 and the UI controller 130. The control device 100 illustrated in FIG. 2 is configured such that only two modules (the device controller 120 and the UI controller 130) are connected in series as stages that follow the system controller 110. Accordingly, return processing according to the procedure (hereinafter referred to as a parallel procedure) of starting processing for establishment of connection between a former-stage module and a latter-stage module in parallel with return processing of the former-stage module is performed only between the device controller 120 and the UI controller 130. However, in a case where multiple (three or more) modules follow the system controller 110, the number of places where the return processing according to the parallel procedure increases accordingly. This shortens a period required for the return processing as compared with return processing according to a procedure (hereinafter referred to as a sequential procedure) of starting processing for establishment of connection between a former-stage module and a latter-stage module after completion of return processing of the former-stage module as described with reference to FIGS. 3 and 4. In general, the effect of shortening a period for return produced by the parallel procedure is higher as the number of modules that follow the system controller 110 is larger.

Meanwhile, in a case where it is unnecessary to perform complicated control such as returning a module that differs depending on a return factor, the system controller 110 may transmit a trigger of return to each module (the device controller 120 and the UI controller 130) on a latter-stage side of the system controller 110 immediately after start of return processing of the system controller 110 (i.e., before completion of return). This causes the device controller 120 and the UI controller 130 to start return processing in parallel with the return processing of the system controller 110 (i.e., before completion of return of the system controller 110). In this return processing, connection between the return controller 140 and the system controller 110, connection between the system controller 110 and the device controller 120, and connection between the device controller 120 and the UI controller 130 are established. The processing for establishing connection between the return controller 140 and the system controller 110, the processing for establishing connection between the system controller 110 and the device controller 120, and the processing for establishing connection between the device controller 120 and the UI controller 130 are performed in parallel independently. The system controller 110, the device controller 120, and the UI controller 130 shift to normal operation after completion of the return processing.

Figure 7:
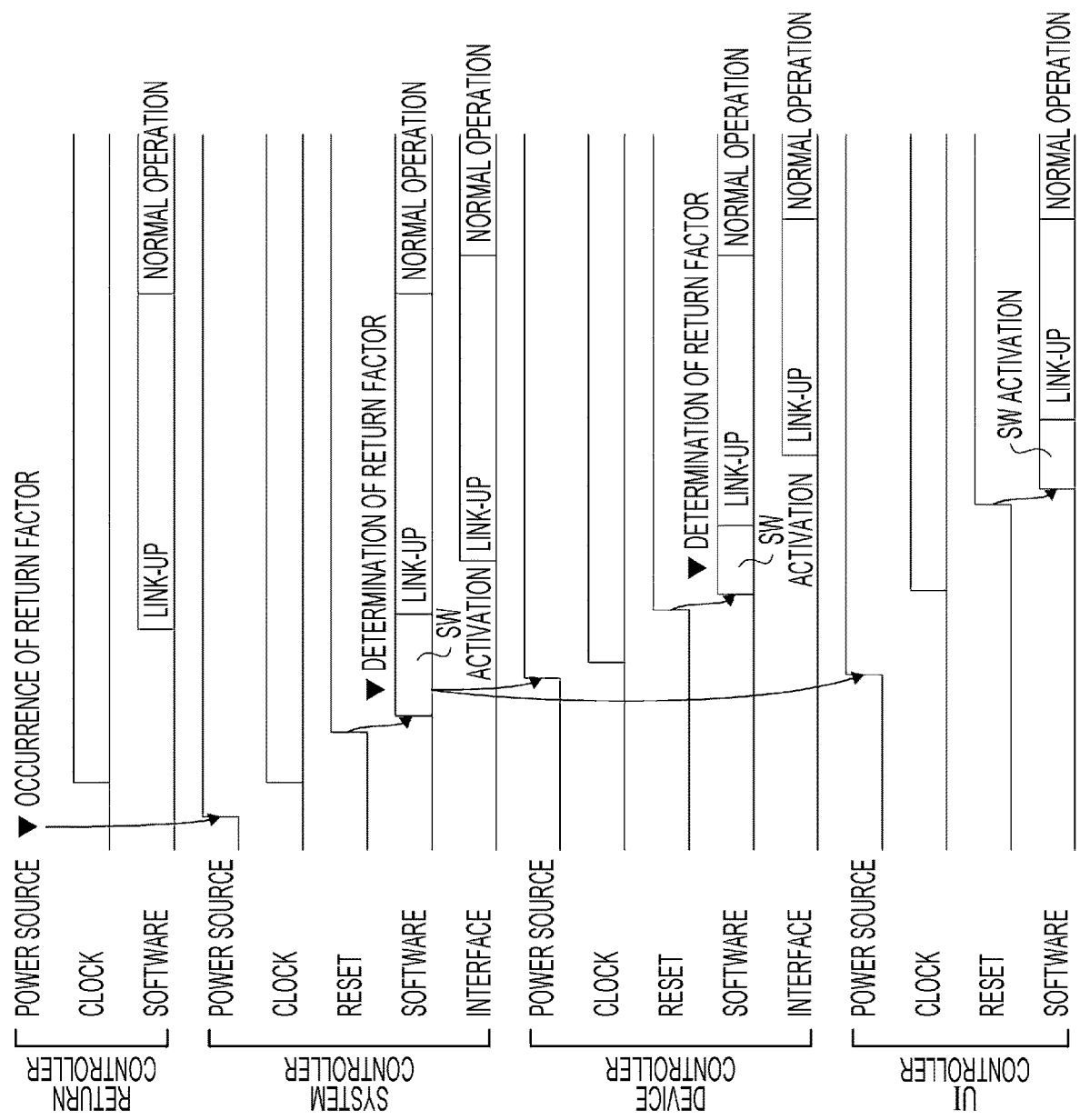
FIG. 7 is a timing diagram illustrating operation of each module in a case where return processing of a device controller and a UI controller is started before completion of return of a system controller.

FIG. 7 is a timing diagram illustrating operation of each module in a case where return processing of the device controller 120 and the UI controller 130 starts before completion of return of the system controller 110. In the example illustrated in FIG. 7, a former-stage module activates software (SW) of a latter-stage module so that the latter-stage module starts return processing by performing electric power control (start of supply) and reset control instead of notification about return as a trigger of return transmitted to the latter-stage module. In FIG. 7, operation of return processing in each of the system controller 110, the device controller 120, and the UI controller 130 is similar to the operation described with reference to FIG. 4. In each module, processing (link-up) for establishing connection of interfaces that connect the module and a latter-stage module is performed after return processing of the latter-stage module starts. This is also similar to the operation illustrated in FIG. 4.

In the operation illustrated in FIG. 7, electric power control and reset control of the system controller 110 causes the device controller 120 and the UI controller 130 to start return processing as in the operation illustrated in FIG. 6. However, in the operation illustrated in FIG. 7, the system controller 110 causes the device controller 120 and the UI controller 130 to start return processing by performing reset control before completion of return processing of the system controller 110 unlike the operation illustrated in FIG. 6. Processing (link-up) for establishing connection of interfaces (PCIEs) for connecting the system controller 110 and the device controller 120 starts before completion of return processing of the system controller 110. Furthermore, processing (link-up) for establishing connection of interfaces (DPs) for connecting the device controller 120 and the UI controller 130 starts before completion of return processing of the system controller 110 and the device controller 120. As a result, in the operation illustrated in FIG. 7, a period from detection of occurrence of a return factor by the return controller 140 to completion of return processing of all modules is further made shorter than the operation illustrated in FIG. 6.

The control device 100 mounted in an information processing apparatus such as the image processing apparatus 10 sometimes has a function used in an early stage after activation for return from an energy-saving mode. A module that performs such a function is required to complete return processing as soon as possible. Examples of such a module include a control module for the UI unit 14 illustrated in FIG. 1 or a graphic accelerator that is a hardware module for performing image processing. Such a module may be made usable in an early stage by applying the present exemplary embodiment to such a module.

Use in an early state after activation in a case where the present exemplary embodiment is applied to the UI controller 130 is described below as an example. During normal operation of the image processing apparatus 10, an image displayed on the UI controller 130 is generated by the system controller 11. That is, an image generated by the system controller 110 is sent to the UI controller 130 through the device controller 120 and is then displayed on the display of the UI unit 14. However, in a case of return from an energy-saving mode, it is sometimes desirable to give a notification about an activated state by displaying an image on the UI unit 14 promptly. In view of this, in such a case, according to the present exemplary embodiment, some sort of image may be displayed on the UI unit 14 when return processing of the device controller 120 and the UI controller 130 is completed, even before completion of return processing of the system controller 110. In such a case, an image can be displayed on the UI unit 14 even before completion of return processing of the system controller 110 by holding, in the device controller 120, data of an initial display image to be displayed on the UI unit 14 at a time of return from an energy-saving mode. Furthermore, in a case where the data of the initial display image is held in the UI controller 130, the initial display image can be displayed on the Ui unit 14 when return processing of the UI controller 130 is completed even in a stage in which not only return processing of the system controller 110, but also return processing of the device controller 120 have not been completed.

Furthermore, a graphic accelerator that performs printing control of the image output device 12 generates print data by sequentially performing image processing on image data plural times while reconfiguring a circuit configuration in accordance with the image processing. This requires a long time for return processing from an energy-saving mode. In view of this, return processing of the device controller 120 that controls the graphic accelerator is performed in parallel with return processing of the system controller 110 by applying the present exemplary embodiment. This makes it possible to complete the return processing of the device controller 120 early, thereby allowing the device controller 120 to start control of the graphic accelerator.

As is clear from the above description, the system controller 110 in the control device 100 according to the present exemplary embodiment is an example of a return controller. The return controller 140 is an example of a return factor detection unit and an example of a return controller.

Modifications

In one modification of the present exemplary embodiment, the system controller 110 performs return processing in parallel with other modules (the device controller 120 and the UI controller 130). According to this configuration, the return controller 140 performs return control on all of the other modules (the system controller 110, the device controller 120, and the UI controller 130).

Figure 8:
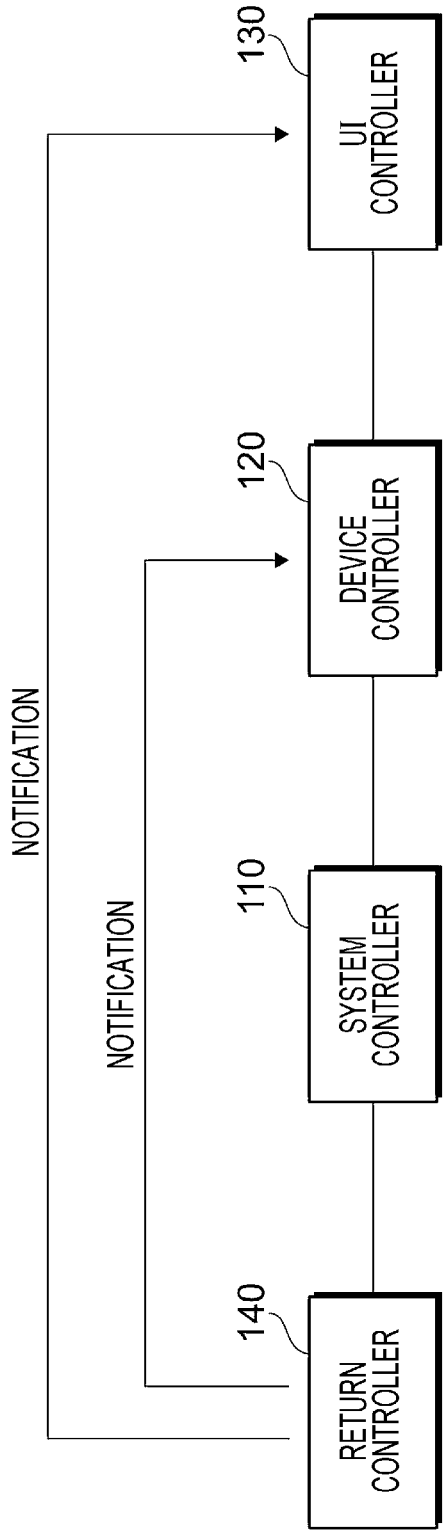
FIG. 8 illustrates a procedure of return processing in a case where a return controller performs return control of all of other modules.

FIG. 8 illustrates a procedure of return processing in a case where the return controller 140 performs return control of all of other modules. In this case, the return controller 140 gives a notification as a trigger of return transmitted to each module (the system controller 110, the device controller 120, and the UI controller 130) on a latter-sage side of the return controller 140 upon detection of a return factor. This causes each of the system controller 110, the device controller 120, and the UI controller 130 to start return processing. In this return processing, connection between the return controller 140 and the system controller 110, connection between the system controller 110 and the device controller 120, and connection between the device controller 120 and the UI controller 130 are established. The system controller 110, the device controller 120, and the UI controller 130 shift to normal operation after completion of return processing.

In this first modification, return processing of the device controller 120 and the UI controller 130 that are modules on the latter-stage side starts before completion of return processing of the system controller 110 that is a former-stage module as in the operation described with reference to FIG. 7. However, in the first modification, return control of the device controller 120 and the UI controller 130 is performed by the return controller 140 unlike the operation illustrated in FIG. 7. Accordingly, the device controller 120 and the UI controller 130 starts return processing independently of return processing of the system controller 110. Therefore, according to the first modification, return processing of the device controller 120 and the UI controller 130 starts even if return processing of the system controller 110 has not started. As a result, a period from detection of occurrence of a return factor by the return controller 140 to completion of return processing of all modules is further made shorter than the operation illustrated in FIG. 7.

In a case where return control of all of the system controller 110, the device controller 120, and the UI controller 130 is performed by the return controller 140, complicated control such as returning a module that differs depending on a return factor cannot be performed by functions of the PHY chip and MAC of the CPU 141 of the return controller 140, unlike a case where the system controller 110 performs return control of the device controller 120 and the UI controller 130. In view of this, for example, a processor that has a function of selecting a module to be returned in accordance with a return factor may be provided in the return controller 140 in order to realize such control. Such a processor can be, for example, a complex programmable logic device (CPLD).

In another modification of the present exemplary embodiment, the system controller 110 returns each latter-stage module after completion of return processing, and a module that has a function used in an early stage after activation is directly connected to the system controller 110. The system controller 110 preferentially returns the module that has a function used in an early stage after activation when the image processing apparatus 10 returns from an energy-saving mode.

Figure 9:
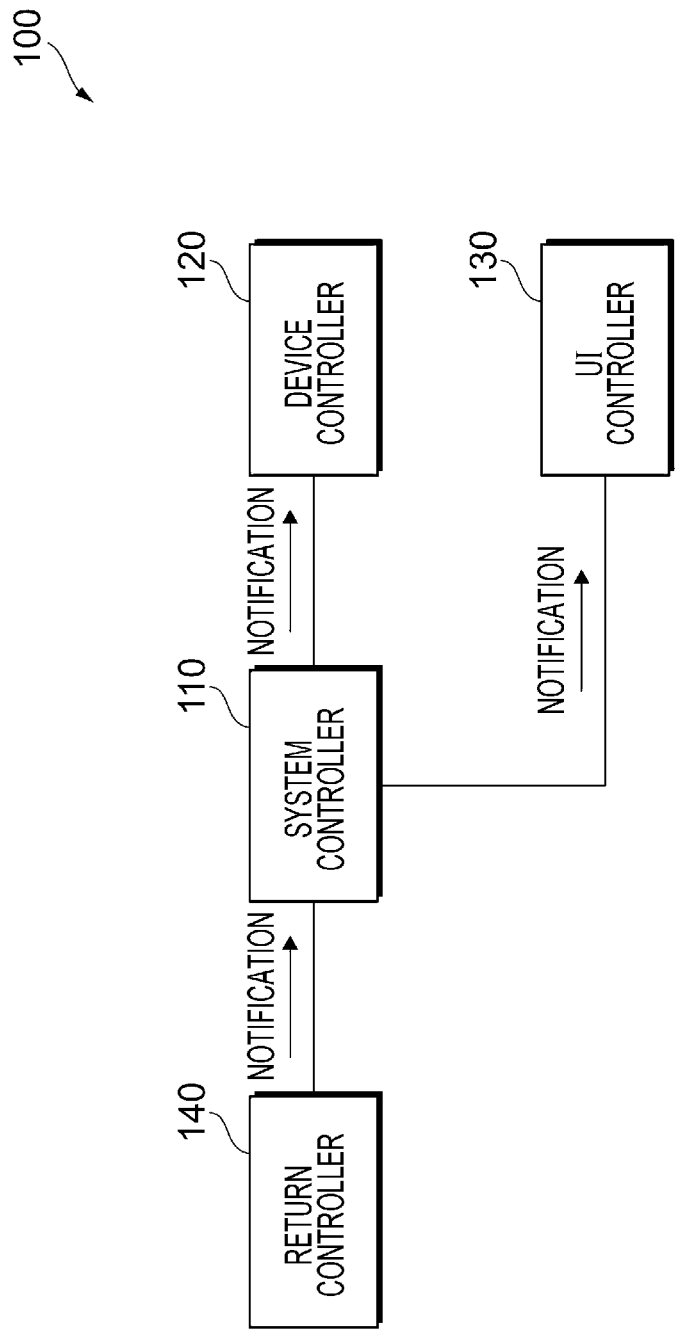
FIG. 9 illustrates a configuration in which the UI controller is directly connected to the system controller in the control device.

FIG. 9 illustrates a configuration in which the UI controller 130 is directly connected to the system controller 110 in the control device 100. According to this configuration, the system controller 110 preferentially causes the UI controller 130 to start return processing for return from an energy-saving mode. Connection (DP) between the system controller 110 and the UI controller 130 is established before completion of return processing of the device controller 120, and the UI controller 130 causes an image to be displayed on the UI unit 14 under control of the system controller 110 as soon as return processing of the UI controller 130 is completed.

Although the present exemplary embodiment has been described above, the technical scope of the present disclosure is not limited to the above exemplary embodiment. Various changes and replacements of a configuration that do not depart from the scope of the technical idea of the present disclosure are encompassed within the present disclosure. For example, although a configuration in which the present exemplary embodiment is applied to the control device 100 of the image processing apparatus 10 has been described above, the present exemplary embodiment can be applied to a control device for any of other various kinds of information processing apparatuses. Furthermore, although the control device 100 according to the present exemplary embodiment includes four modules including the return controller 140 for detecting a return factor that are connected in series by using a single control system, the present exemplary embodiment can be widely applied to an electronic device that includes multiple modules including plural control systems.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electronic device comprising:
a plurality of modules;
a return factor detection unit that detects a return factor by using a physical layer chip and a media access control causing return from an energy-saving state; and
a return controller that causes the plurality of modules to start return processing upon detection of the return factor by the return factor detection unit; and
wherein the plurality of modules include a first module and a second module that are connected by using a high-speed serial interface that needs preprocessing for establishment of connection without software, and the second module, which performs return processing upon receipt of a trigger of return from an energy-saving state through the first module, starts the preprocessing for establishment of connection using the high-speed serial interface in parallel with return processing of the first module,
wherein the second module is used before completion of return processing of other modules and starts the preprocessing for establishing of connection using the high-speed serial interface that connects the first module and the second module in parallel with the return processing of the first module, and
the second module acquires an image from the first module before completion of the return processing of the other modules when return processing of the second module is completed and the preprocessing for establishment of connection using the high-speed serial interface with the first module is completed, and the second module displays the image,
at least one module other than the second module among the plurality of modules is a module that controls display operation of the second module, and the second module displays a predetermined image before completion of return processing of the module that controls display operation of the second module when the return processing of the second module is completed and the preprocessing for establishment of connection using the high-speed serial interface with the first module is completed.

2. The electronic device according to claim 1, wherein in a case where the high-speed serial interface that connects the first module and the second module and starts the preprocessing for establishment of connection in return processing in parallel with the return processing of the first module is provided at a plurality of positions, the preprocessing is performed at the plurality of positions independently.

3. The electronic device according to claim 2, wherein the high-speed serial interface is provided at at least two positions each located between two modules among three or more modules connected in series; and
the preprocessing is performed at the at least two positions in parallel independently in return processing.

4. An electronic device comprising:
a plurality of modules;
return factor detection means for detecting a return factor by using a physical layer chip and a media access control causing return from an energy-saving state; and
a return controlling means for causing the plurality of modules to start return processing upon detection of the return factor by the return factor detection means; and
wherein the plurality of modules include a first module and a second module that are connected by using a high-speed serial interface that needs preprocessing for establishment of connection without software, and the second module, which performs return processing upon receipt of a trigger of return from an energy-saving state through the first module, starts the preprocessing for establishment of connection using the high-speed serial interface in parallel with return processing of the first module,
wherein the second module is used before completion of return processing of other modules and starts the preprocessing for establishment of connection using the high-speed serial interface that connects the first module and the second module in parallel with the return processing of the first module, the second module acquires an image from the first module before completion of the return processing of the other modules when return processing of the second module is completed and the preprocessing for establishment of connection using the high-speed seral interface with the first module is completed, and displays the image, at least one module other than the second module among the plurality of modules is a module that controls display operation of the second module, and the second module displays a predetermined image before completion of return processing of the module that controls display operation of the second module when the return processing of the second module is completed and the preprocessing for establishment of connection using the high-speed serial interface with the first module is completed.

* * * * *